United States Patent
Shibuya et al.

(10) Patent No.: US 10,684,808 B2
(45) Date of Patent: Jun. 16, 2020

(54) PROCESSING APPARATUS, PROCESSING SYSTEM, NON-TRANSITORY COMPUTER READABLE MEDIUM, AND PROCESSING METHOD FOR MANAGING RESERVATION OF RESOURCES

(71) Applicant: FUJI XEROX CO., LTD., Tokyo (JP)

(72) Inventors: Takeshi Shibuya, Kanagawa (JP); Koma Morita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 668 days.

(21) Appl. No.: 15/340,495

(22) Filed: Nov. 1, 2016

(65) Prior Publication Data
US 2017/0364312 A1 Dec. 21, 2017

(30) Foreign Application Priority Data
Jun. 15, 2016 (JP) ................................ 2016-118635

(51) Int. Cl.
| | | |
|---|---|---|
| *G06F 3/12* | (2006.01) | |
| *G06F 21/60* | (2013.01) | |
| *H04N 1/00* | (2006.01) | |
| *G06F 3/0482* | (2013.01) | |
| *H04N 1/44* | (2006.01) | |

(52) U.S. Cl.
CPC .......... *G06F 3/1229* (2013.01); *G06F 3/0482* (2013.01); *G06F 3/126* (2013.01); *G06F 3/1217* (2013.01); *G06F 3/1236* (2013.01); *G06F 3/1292* (2013.01); *G06F 21/608* (2013.01); *H04N 1/00111* (2013.01); *H04N 1/00233* (2013.01); *H04N 1/00315* (2013.01); *H04N 1/00334* (2013.01); *H04N 1/00954* (2013.01); *H04N 1/4433* (2013.01);
(Continued)

(58) Field of Classification Search
CPC ...... G06F 3/1229; G06F 3/1292; G06F 3/126; G06F 3/1236; G06F 3/0482; G06F 21/608; G06F 3/1217; G06F 3/1239; G06F 3/1296; G06F 3/122; H04N 1/4433; H04N 1/00334; H04N 1/00315; H04N 1/00111; H04N 2201/0094; H04N 2201/006; H04N 1/00954; H04N 1/00233
See application file for complete search history.

(56) References Cited

U.S. PATENT DOCUMENTS

| | | | |
|---|---|---|---|
| 2012/0236353 A1* | 9/2012 | Nagayama | ......... G03G 15/5004 358/1.13 |
| 2017/0228624 A1* | 8/2017 | Nakayama | ............ G06F 3/1211 |

FOREIGN PATENT DOCUMENTS

| | | |
|---|---|---|
| JP | 2013-196126 A | 9/2013 |
| JP | 2015-126318 A | 7/2015 |

OTHER PUBLICATIONS

Mar. 3, 2020 Office Action issued in Japanese Patent Application No. 2016-118635.

* cited by examiner

*Primary Examiner* — Kent Yip
(74) *Attorney, Agent, or Firm* — Oliff PLC (57) ABSTRACT

A processing apparatus includes a detector, an acceptance unit, and a manager. The detector detects a user. The acceptance unit accepts an operation performed by the user for selecting a process. The manager manages plural resources of the processing apparatus so as to reserve, upon detection of the user by the detector, the plural resources and to release, upon acceptance of the operation by the acceptance unit, a resource among the plural resources that is not necessary for the process selected in the operation.

14 Claims, 6 Drawing Sheets

(52) U.S. Cl.
CPC ...... *G06F 3/1239* (2013.01); *H04N 2201/006* (2013.01); *H04N 2201/0094* (2013.01)

| NAME | TYPE | ADDRESS INFORMATION |
|---|---|---|
| AAA | FACSIMILE NUMBER | 0x-11xx-1111 |
| BBB | EMAIL | ••• |
| CCC | FTP SERVER | ••• |
| ••• | ••• | ••• |

FIG. 9

| NAME | TYPE |
|---|---|
| AAA | FACSIMILE NUMBER |
| BBB | EMAIL |
| CCC | FTP SERVER |
| ••• | ••• |

FIG. 10

| TYPE | PROCESS |
|---|---|
| FACSIMILE NUMBER | FACSIMILE |
| EMAIL | SCANNING (EMAIL FORWARDING) |
| FTP SERVER | ••• |
| ••• | ••• |

PROCESSING APPARATUS, PROCESSING SYSTEM, NON-TRANSITORY COMPUTER READABLE MEDIUM, AND PROCESSING METHOD FOR MANAGING RESERVATION OF RESOURCES

CROSS-REFERENCE TO RELATED APPLICATIONS

This application is based on and claims priority under 35 USC 119 from Japanese Patent Application No. 2016-118635 filed Jun. 15, 2016.

BACKGROUND

Technical Field

The present invention relates to a processing apparatus, a processing system, a non-transitory computer readable medium, and a processing method.

SUMMARY

According to an aspect of the invention, there is provided a processing apparatus including a detector, an acceptance unit, and a manager. The detector detects a user. The acceptance unit accepts an operation performed by the user for selecting a process. The manager manages plural resources of the processing apparatus so as to reserve, upon detection of the user by the detector, the plural resources and to release, upon acceptance of the operation by the acceptance unit, a resource among the plural resources that is not necessary for the process selected in the operation.

BRIEF DESCRIPTION OF THE DRAWINGS

An exemplary embodiment of the present invention will be described in detail based on the following figures, wherein.

DETAILED DESCRIPTION

1. Exemplary Embodiment

1-1. Overall Configuration of Processing System

Figure 1:
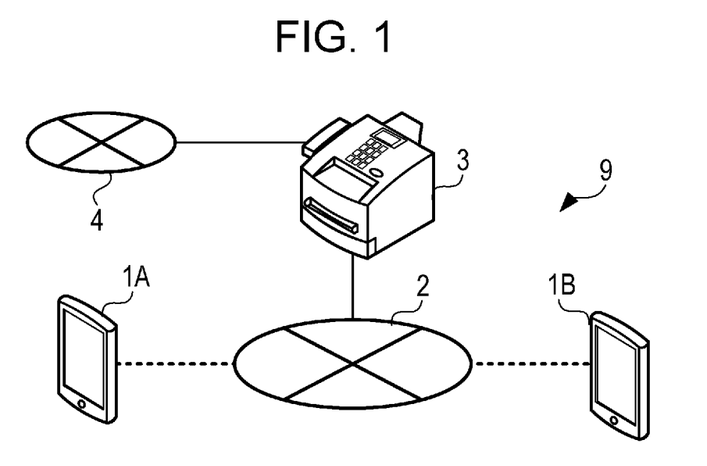
FIG. 1 is a diagram illustrating an overall configuration of a processing system according to an exemplary embodiment.

FIG. 1 is a diagram illustrating an overall configuration of a processing system 9 according to an exemplary embodiment. The processing system 9 includes a communication line 2 that constitutes a local area network (LAN), and plural terminals 1 and a processing apparatus 3 that are connected to the communication line 2. The plural terminals 1 illustrated in FIG. 1 are a terminal 1A and a terminal 1B.

The processing apparatus 3 has an image reading (scanner) function of optically reading an image formed on a medium, such as a sheet, and an image forming (printer) function of forming an image on a medium, such as a sheet, on the basis of image data.

In FIG. 1, the processing apparatus 3 is also connected to a public telephone line 4 and further has an image transmission (facsimile) function of transmitting image data to other apparatuses via the public telephone line 4.

The processing apparatus 3 further has an image processing function of processing obtained image data by performing various arithmetic operations.

The terminal 1 is configured to make a connection with the processing apparatus 3 via a wireless access point (not illustrated) that is connected to the communication line 2. The wireless access point provides a function of connecting the terminal 1 with the communication line 2 in accordance with a scheme compliant with a wireless LAN standard, such as IEEE 802.11, for example.

The processing apparatus 3 and the terminal 1 may have a function of making a connection with each other in accordance with a scheme compliant with a near field communication (NFC) standard, such as ISO/IEC 18092 (NFCIP-1), ISO/IEC 14443, ISO/IEC 15693, or IEEE 802.15, for example.

1-2. Configuration of Terminal

Figure 2:
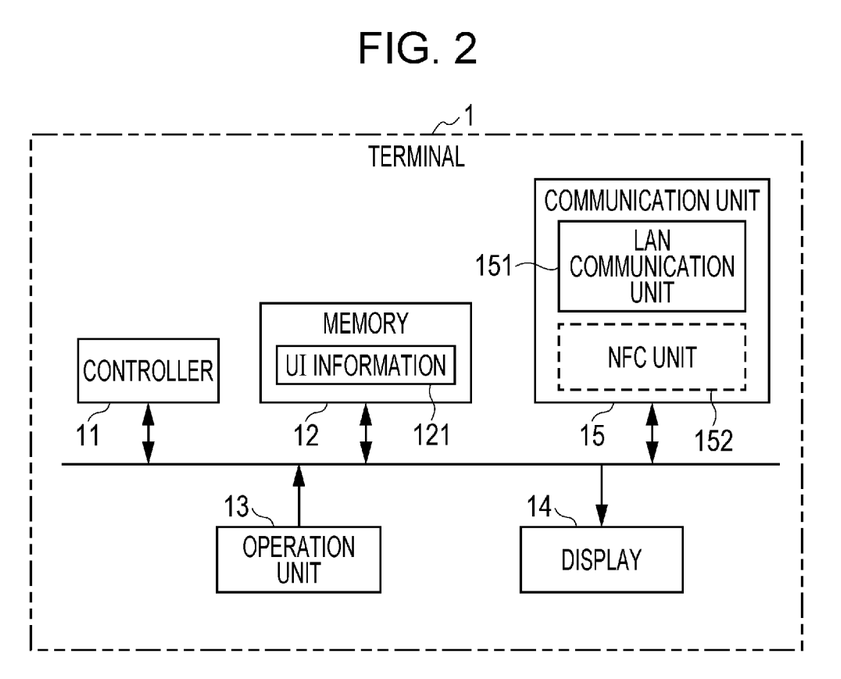
FIG. 2 is a diagram illustrating an example configuration of a terminal.

FIG. 2 is a diagram illustrating an example configuration of the terminal 1. The terminal 1 includes a controller 11, a memory 12, an operation unit 13, a display 14, and a communication unit 15.

The controller 11 includes a central processing unit (CPU), a read-only memory (ROM), and a random access memory (RAM) and controls each unit in the terminal 1 by the CPU reading and executing a computer program (hereinafter simply referred to as a program) stored in the ROM or in the memory 12.

The operation unit 13 includes operation devices, such as operation buttons or a touch panel, for inputting various instructions, accepts an operation performed by a user, and supplies a signal corresponding to the details of the operation to the controller 11.

The display 14 includes a liquid crystal display and displays various types of information as instructed by the controller 11. On the liquid crystal display of the display 14, the touch panel of the operation unit 13 may be stacked and disposed. In this case, the touch panel is formed of a transparent material so that a user is able to see an image displayed on the liquid crystal display of the display 14.

The memory 12 is a bulk memory, such as a solid state drive, and stores the program read by the CPU of the controller 11. The memory 12 further stores user interface (UI) information 121 as illustrated in FIG. 2.

The UI information 121 is, for example, information about an operation screen transmitted from the processing apparatus 3 via the communication line 2 and is information that represents a UI for accepting an operation directed to the processing apparatus 3. In the terminal 1, the display 14 displays an operation screen for operating the processing apparatus 3 by using the UI information 121 stored in the memory 12, and the operation unit 13 accepts an operation for selecting a process that is to be performed by the processing apparatus 3.

The communication unit 15 includes a LAN communication unit 151. The LAN communication unit 151 is a communication circuit that makes a connection with the communication line 2 via the wireless access point. The communication unit 15 may include an NFC unit 152 outlined by a broken line in FIG. 2. In this case, the NFC unit 152 is a communication circuit that makes a connection with the processing apparatus 3 in accordance with a scheme compliant with an NFC standard.

1-3. Configuration of Processing Apparatus

Figure 3:
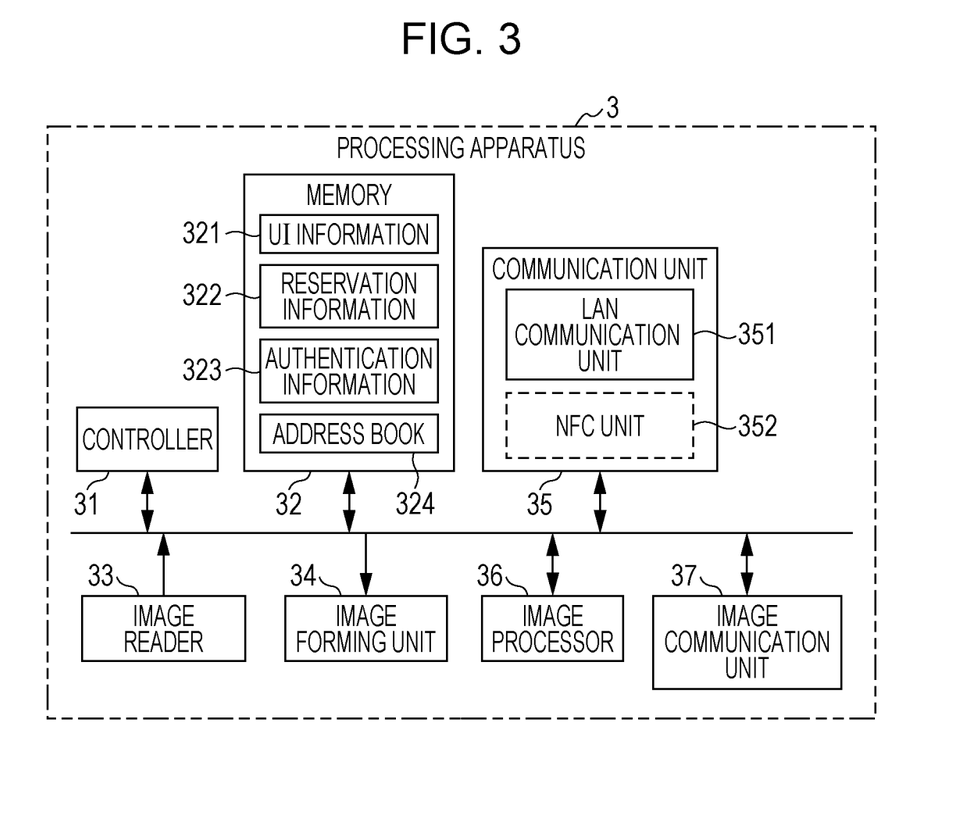
FIG. 3 is a diagram illustrating an example configuration of a processing apparatus.

FIG. 3 is a diagram illustrating an example configuration of the processing apparatus 3. The processing apparatus 3 includes a controller 31, a memory 32, an image reader 33, an image forming unit 34, a communication unit 35, an image processor 36, and an image communication unit 37. The controller 31 includes a CPU, a ROM, and a RAM and controls each unit in the processing apparatus 3 by the CPU reading and executing a program stored in the ROM or in the memory 32.

The memory 32 is a bulk memory, such as a hard disk drive, and stores the program read by the CPU of the controller 31. The memory 32 further stores UI information 321, reservation information 322, authentication information 323, and an address book 324.

The UI information 321 is original information about an operation screen that is transmitted to the terminal 1 and displayed, and is information that represents a UI for giving an instruction to the processing apparatus 3 at the terminal 1.

The reservation information 322 is information that indicates the states of plural resources provided to the processing apparatus 3. The reservation information 322 contains information about resources among the plural resources that are reserved and about users for which the resources are reserved, and information about resources among the plural resources that are released (that is, not occupied by any users). The controller 31 manages the plural resources by updating the content contained in the reservation information 322.

The authentication information 323 contains plural sets of identification information, such as the user ID of a user registered in advance, and authentication information, such as a password that only the user knows. The controller 31 checks a set of identification information and authentication information received from an external apparatus via the communication unit 35 against the content contained in the authentication information 323 and verifies the identity of the user identified with the received identification information.

The communication unit 35 includes a LAN communication unit 351. The LAN communication unit 351 is a communication circuit that makes a wired or wireless connection with the communication line 2.

The communication unit 35 may include an NFC unit 352 outlined by a broken line in FIG. 3. The NFC unit 352 is a communication circuit that makes a connection with the terminal 1 in accordance with a scheme compliant with an NFC standard.

The image reader 33 is a unit that optically reads a document. The image reader 33 includes an image sensor, such as a charge-coupled device (CCD) image sensor, and generates image data that represents a document. The image reader 33 may be a flat-bed-type image sensor that reads a document while moving its image sensor, a sheet-feed-type image sensor that reads a document without changing the position of its image sensor while moving the document, or an image reader of another type.

The image forming unit 34 is a unit that forms an image on the basis of image data. The image forming unit 34 forms an image on a sheet in accordance with an electrophotographic system or a thermal transfer system, for example.

The image processor 36 is a unit that performs a process of performing various arithmetic operations on image data or performing processing on image data. The image processor 36 may be an arithmetic unit called a graphics board or a graphics processing unit (GPU).

The image communication unit 37 is a communication circuit for making a connection with other apparatuses via the public telephone line 4 illustrated in FIG. 1 and for transmitting and receiving image data.

The controller 31 controls resources, namely, the image reader 33, the image forming unit 34, the image processor 36, and the image communication unit 37 described above in accordance with the content of the reservation information 322 and performs a process as instructed by a user by using these resources if a condition is satisfied.

1-4. Functional Configuration of Processing Apparatus

Figure 4:
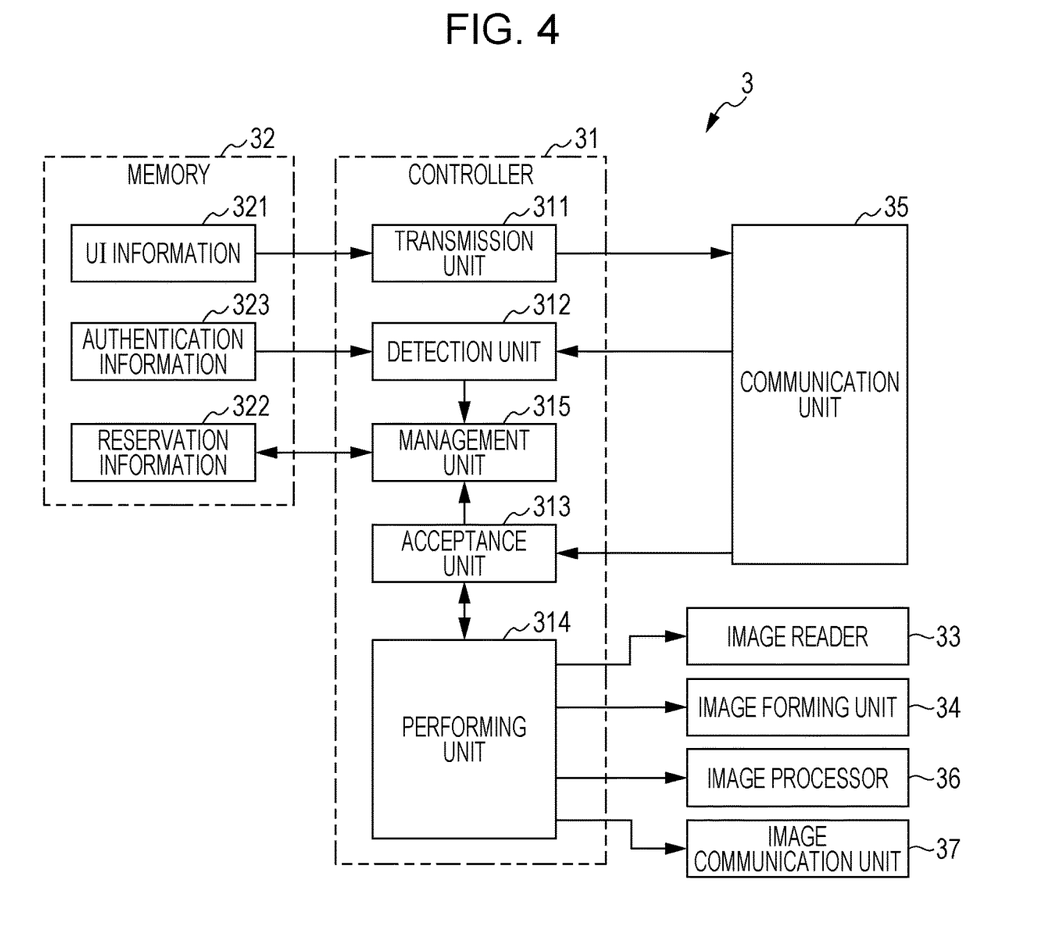
FIG. 4 is a diagram illustrating an example functional configuration of the processing apparatus.

FIG. 4 is a diagram illustrating an example functional configuration of the processing apparatus 3. The controller 31 of the processing apparatus 3 functions as a transmission unit 311, a detection unit 312, an acceptance unit 313, a performing unit 314, and a management unit 315 by executing the program read from the memory 32.

The transmission unit 311 transmits the UI information 321 to one of the terminals 1 (terminal 1A or terminal 1B) illustrated in FIG. 1 via the communication unit 35. The UI information 321 transmitted this time may be information about an operation screen for an authentication operation in which a user is prompted to input the user's identifier and password.

The detection unit 312 detects, on the basis of a signal received from the terminal 1 to which the UI information 321 has been transmitted, a user who attempts to use the processing apparatus 3 by using the terminal 1. The detection unit 312 may, after detecting a user, transmit the UI information 321 that represents a menu screen, which is an initial screen corresponding to the detected user, to the terminal 1 via the communication unit 35.

The acceptance unit 313 accepts an operation performed by the detected user for selecting a process from among plural processes.

The performing unit 314 performs the process selected in the accepted operation in cooperation with at least one of the plural resources provided to the processing apparatus 3. Here, the plural resources provided to the processing apparatus 3 are the image reader 33, the image forming unit 34, the image processor 36, and the image communication unit 37, for example.

The management unit 315 manages the resources when the detection unit 312 detects a user so that the plural resources provided to the processing apparatus 3 are reserved for the user. When a user is detected, the management unit 315 reserves all of the resources, namely, the image reader 33, the image forming unit 34, the image processor 36, and the image communication unit 37, and prohibits the resources from being used by other users.

When the acceptance unit 313 accepts an operation performed by the user after the management unit 315 has reserved all of the resources, the management unit 315 manages the resources so that one or more resources among the reserved resources that are not necessary for the process selected in the operation are released.

The acceptance unit 313 accepts, after the detection unit 312 has detected a user, an operation performed by the user; however, the acceptance unit 313 may accept an operation performed by the user before, and not after, the management unit 315 reserves all of the resources. Also in this case, the management unit 315 manages the resources of the processing apparatus 3 so that one or more resources that are not necessary for the process selected in the operation accepted by the acceptance unit 313 are released.

1-5. Operation in Processing System

Figure 5:
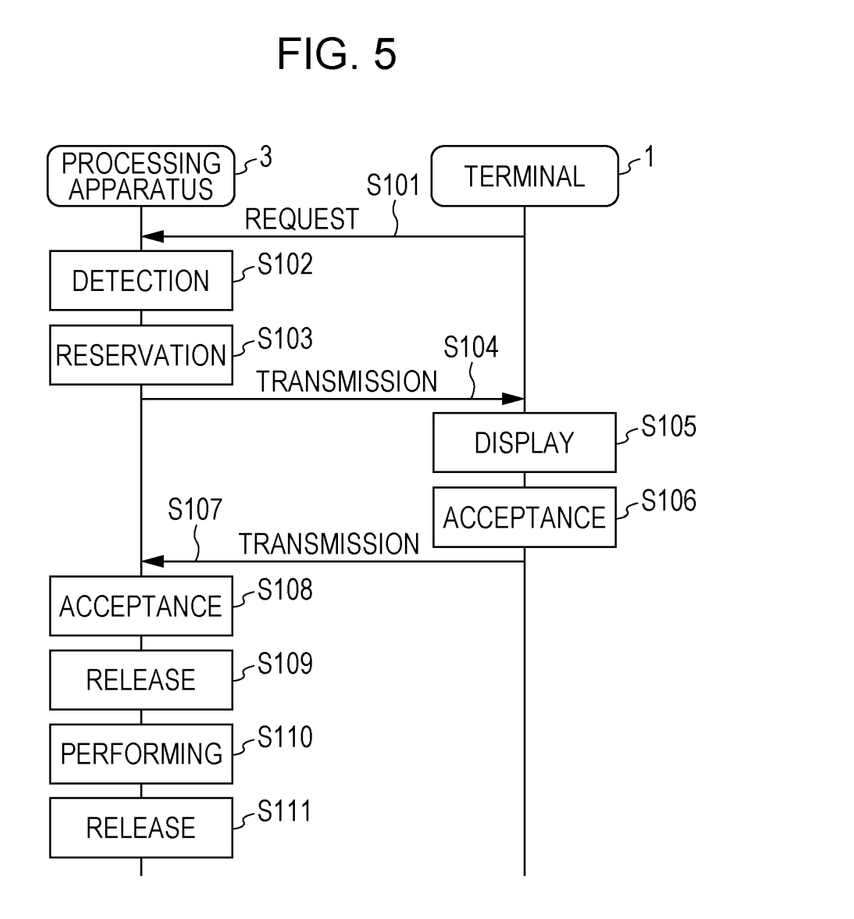
FIG. 5 is a sequence chart illustrating an example operation in the processing system.

FIG. 5 is a sequence chart illustrating an example operation in the processing system 9. The terminal 1 sends to the processing apparatus 3 a request for the UI information 321 that represents an operation screen together with a set of identification information, such as the user's user ID, and authentication information, such as a password (step S101).

The processing apparatus 3 performs authentication by using the identification information and authentication information included in the request upon receiving the request. The authentication is performed by checking the set of the identification information and authentication information included in the received request against the content contained in the authentication information 323. If the authentication is successful, the processing apparatus 3 detects the user identified with the identification information (step S102).

When the processing apparatus 3 detects the user, the processing apparatus 3 reserves, for the user, all resources provided to the processing apparatus 3 (step S103). Specifically, the processing apparatus 3 overwrites the states of all resources described in the reservation information 322 to "reserved". The processing apparatus 3 may check if a resource is reserved by another user before reserving the resources and may reserve all resources if no resource is reserved by other users.

Figure 6A:
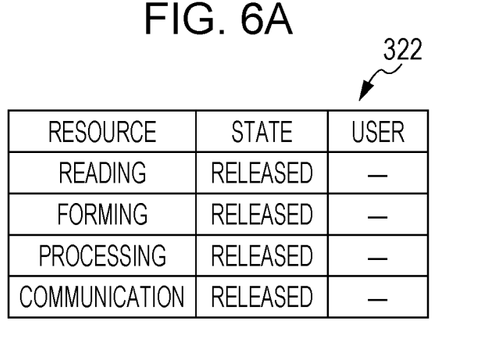
FIGS. 6A to 6D are diagrams illustrating the content contained in reservation information.
Figure 6B:
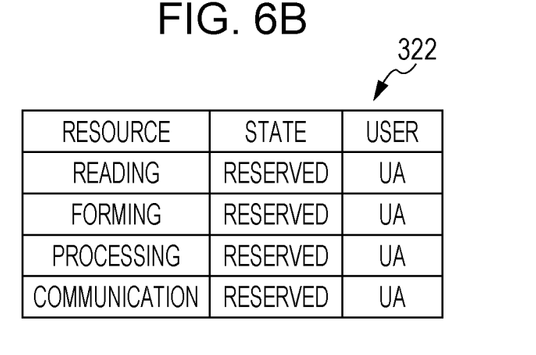

FIGS. 6A to 6D are diagrams illustrating the content contained in the reservation information 322. In a case where no request for the UI information 321 that represents an operation screen is sent from any of the terminals 1, the reservation information 322 illustrated in FIG. 6A is stored in the memory 32 of the processing apparatus 3. In the reservation information 322 illustrated in FIG. 6A, all of the four resources, namely, resources for reading, forming, processing, and communication, are in a "released" state. When a user identified with identification information "UA" is detected in this state, the processing apparatus 3 overwrites the states of all of the resources to "reserved". As a result, the reservation information 322 contains the content illustrated in FIG. 6B.

Subsequently, the processing apparatus 3 transmits the UI information 321 to a corresponding one of the terminals 1 in response to the received request (step S104).

Figure 7:
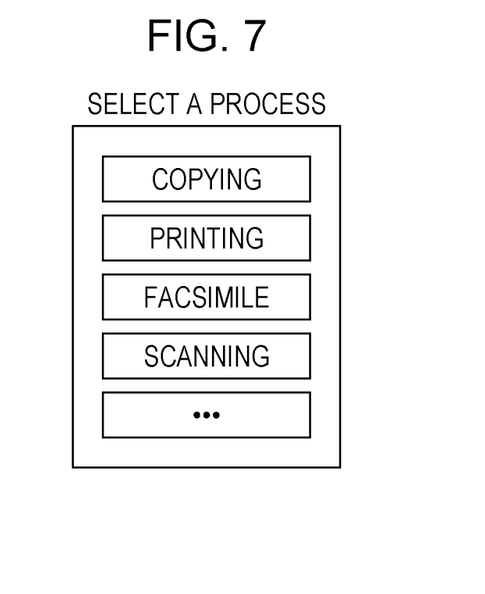
FIG. 7 is a diagram illustrating an example menu screen.

The terminal 1 displays an operation screen on the display 14 on the basis of the UI information 121, which is a copy of the UI information 321 obtained from the processing apparatus 3 (step S105). At this time, the operation screen displayed on the display 14 of the terminal 1 may be a menu screen that corresponds to the initial screen of the user. FIG. 7 is a diagram illustrating an example of the menu screen.

The menu screen is a screen on which the user is prompted to select any of the plural processes (copying, printing, facsimile, and scanning processes, for example) that the processing apparatus 3 is able to perform. The terminal 1 accepts an operation on the operation screen performed by the user using the operation unit 13 (step S106). The accepted operation is coded and transmitted to the processing apparatus 3 (step S107).

When the processing apparatus 3 accepts the user operation from the terminal 1 (step S108), the processing apparatus 3 releases one or more resources that are not necessary for the process selected in the operation among the resources reserved in step S103 (step S109). The processing apparatus 3 may transmit the UI information 321 that represents a setting screen for setting parameters relating to the selected process to the terminal 1 via the communication unit 35 (step not illustrated).

In the case where the terminal 1 receives from the processing apparatus 3 the UI information 321 that represents a setting screen for setting parameters relating to the process, the terminal 1 displays the setting screen for setting parameters relating to the process on the display 14 and accepts parameter settings set by the user on the displayed setting screen. Parameters relating to a process mentioned here include, if the parameters are those relating to image reading, a read resolution setting and a setting regarding selection of monochrome or color, and if the parameters are those relating to image forming, a sheet size setting, a setting regarding selection of monochrome or color, and an N-up setting for composite printing of plural pages.

The setting screen for setting parameters relating to a process includes a button displayed for giving an instruction for performing the process, and when the user who has set settings necessary for the process presses the button, the set parameters and an operation for giving an instruction for performing the process are coded and transmitted to the processing apparatus 3.

The processing apparatus 3 performs the process selected in the accepted operation (step S110). When the process is completed, the processing apparatus 3 releases the one or more resources used in the process (step S111).

Figure 6C:
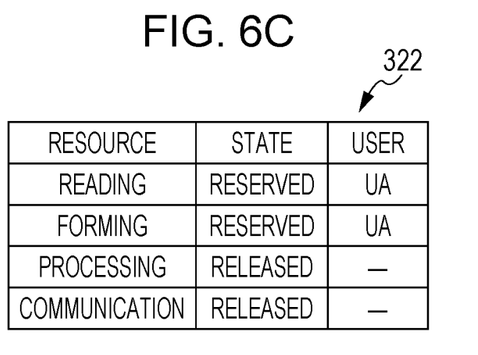

It is assumed that "copying" in which an image of a document is read by the image reader 33 and the image is formed on a supplied sheet by the image forming unit 34 is selected in an accepted operation, for example. Among the four resources, the "copying" process uses the image reader 33 and the image forming unit 34 but does not use the image processor 36 and the image communication unit 37. Therefore, when an operation for selecting "copying" is accepted from a user, the controller 31 of the processing apparatus 3 overwrites the reservation information 322 so that "released" is indicated in the state fields corresponding to the "processing" and "communication" fields among the resource fields and so that "-", which represents absence, is indicated in the user fields corresponding to the "processing" and "communication" fields. As a result, the reservation information 322 contains the content illustrated in FIG. 6C.

When "copying" selected by the user "UA" is completed, the processing apparatus 3 overwrites the reservation information 322 and releases all resources. As a result, the reservation information 322 contains the content illustrated in FIG. 6A.

Figure 6D:
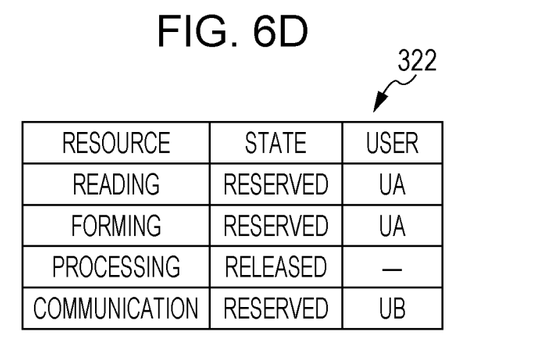

In a case where an operation for selecting "facsimile transmission", for example, is accepted from a user "UB" of the other terminal 1 before the above-described "copying" is completed, the processing apparatus 3 reserves the image communication unit 37, which is released, for the user "UB"

who has performed the operation. Specifically, the controller 31 of the processing apparatus 3 overwrites the reservation information 322 so that "reserved" is indicted in the state field corresponding to the "communication" field among the resource fields and so that "UB", which represents the user who has performed the operation, is indicated in the user field corresponding to the "communication" field. As a result, the reservation information 322 contains the content illustrated in FIG. 6D. Subsequently, the processing apparatus 3 performs the selected "facsimile transmission" by using the image communication unit 37.

That is, in a state where a process selected in an operation performed by a user is not completed and all resources are not released, the processing apparatus 3 may accept an operation performed by another user. In this case, the processing apparatus 3 accepts an operation for selecting a process that uses only one or more resources that are not reserved from among the plural processes performed thereby.

With the operation described above, the processing apparatus 3 accepts, without waiting for completion of a process selected in an operation performed by a user, an operation performed by another user.

2. Modifications

Although the description of the exemplary embodiment has been given above, the exemplary embodiment may be modified as follows or modifications described below may be combined.

2-1. First Modification

In the above-described exemplary embodiment, a process is selected on the menu screen displayed on the terminal 1; however, a process may be selected at a time point when a destination of communication used in the process is selected from the address book 324. The address book 324 may be displayed in response to selection on the menu screen described in the exemplary embodiment or may be displayed instead of the menu screen as the initial screen corresponding to the user.

Figure 8:
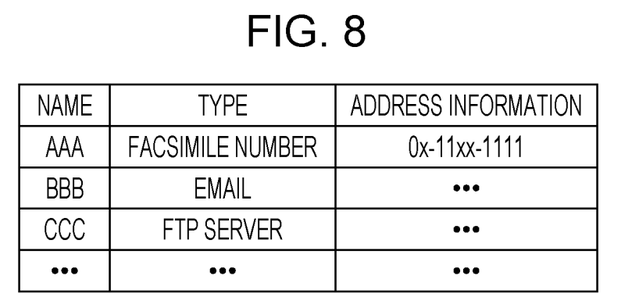
FIG. 8 is a diagram illustrating a data structure of an address book.

FIG. 8 is a diagram illustrating a data structure of the address book 324. In this modification, the address book 324 is constituted by three items, namely, the name of a destination of communication used in a process, the type of address, and address information. The name of a destination is described in a form identifiable by a user. Examples of the name of a destination include a person's name, a company's name, a department's name, and a server name. In the example illustrated in FIG. 8, the names corresponding to three destinations, namely, "AAA", "BBB", and "CCC", are indicated. The type of address is information that indicates the type of communication to which the address corresponds. Examples of the type of address include facsimile number, email, File Transfer Protocol (FTP) server, Hypertext Transfer Protocol (HTTP) server, and remote folder. The address information is information that indicates an address used in communication. For example, a facsimile number is described as a telephone number, such as "0x-11xx-1111", and an email address is described in a form compliant with RFC 5321 or RFC 5322.

An operation performed in this modification is described. Here, the initial screen that is transmitted in step S104 in FIG. 5 of the above-described exemplary embodiment is assumed to be an operation screen on which the address book 324 is displayed, and a description is given. The processing apparatus 3 transmits the UI information 321 that corresponds to an operation screen for operating the address book 324, which is the initial screen corresponding to the detected user, to the terminal 1 via the communication unit 35.

Figure 9:
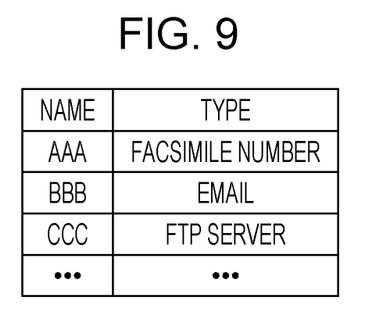
FIG. 9 is a diagram illustrating example display of the address book.

When the terminal 1 receives the UI information 321 that corresponds to the operation screen for operating the address book 324, the terminal 1 displays on the display 14 the operation screen for operating the address book 324 on the basis of the received UI information 321. FIG. 9 is a diagram illustrating example display of the address book 324. In the example illustrated in FIG. 9, the address book 324 having the data structure illustrated in FIG. 8 is illustrated. In the display of the address book 324, "facsimile number", "email", and "FTP server" that are displayed in association with the names of destinations indicate the types of addresses of the respective destinations, which may or may not be displayed.

When the user selects any of the destinations displayed on the display 14, information indicating the selection of the destination is coded and transmitted to the processing apparatus 3 via the communication unit 15.

Figure 10:
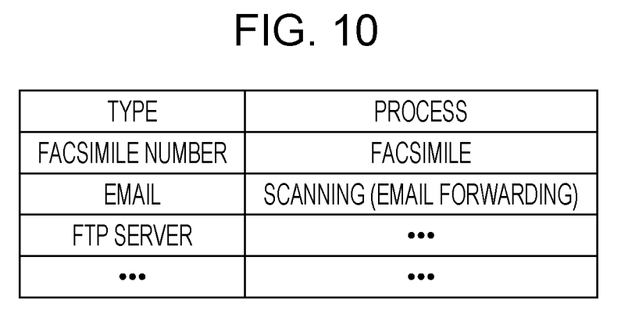
FIG. 10 is a diagram illustrating example correspondences between the types of addresses and processes.

When the processing apparatus 3 receives the information transmitted from the terminal 1 and indicating the selection of the destination, the processing apparatus 3 identifies a process that corresponds to the selected destination. The processing apparatus 3 first extracts the type of address that corresponds to the selected destination on the basis of the address book 324 and thereafter identifies a process that corresponds to the extracted type of address. This identification is performed on the basis of information that indicates correspondences between the types of addresses and processes stored in the memory 32. FIG. 10 is a diagram illustrating example correspondences between the types of addresses and processes.

In a case where "AAA" is specified as the destination, for example, "facsimile number" is extracted as the corresponding type of address, and "facsimile" is identified as a process that corresponds to "facsimile number". In a case where "BBB" is specified as the destination, "email" is extracted as the corresponding type of address, and "scanning (email forwarding)", which is a process of transmitting an image read by the image reader 33 via the communication unit 35 as an email, is identified as a process that corresponds to "email". In a case where plural destinations are specified, plural corresponding processes may be identified.

When a process that corresponds to the destination is identified, the processing apparatus 3 performs, on the basis of the identified process, a similar operation as in the steps after step S108, which is a step of acceptance, in the flow in FIG. 5 of the above-described exemplary embodiment. In a case where plural processes are identified, one or more resources that are not necessary for the plural processes are released.

2-2. Second Modification

In the above-described exemplary embodiment, the memory 32 of the processing apparatus 3 stores the authentication information 323; however, the memory 32 need not store the authentication information 323. In this case, the detection unit 312 detects a user without authenticating the user. Specifically, the controller 31 of the processing apparatus 3 may detect a user only on the basis of identification information of the user received from the terminal 1, for example. In order for the processing apparatus 3 to receive identification information of a user, an optically read twodimensional code may be affixed to the housing of the terminal 1 or a transmitter that transmits a radio beacon may be provided inside the terminal 1, for example.

A user need not be identified with identification information. In this case, the reservation information 322 need not include fields for describing identification information of users. In short, the processing apparatus 3 may reserve one or more resources for a user who is detected but is not identified or authenticated.

2-3. Third Modification

In the above-described exemplary embodiment, the processing apparatus 3 reserves, upon detection of a user, all resources for the user, and releases, upon acceptance of an operation performed by the user, one or more resources that are not necessary for a process selected in the operation among the reserved resources. However, in a case where the processing apparatus 3 accepts an operation performed by a user before detecting the user or in a case where the processing apparatus 3 accepts an operation performed by a user simultaneously with detection of the user, the processing apparatus 3 may reserve only one or more resources necessary for a process selected in the operation without reserving all resources.

2-4. Fourth Modification

In the above-described exemplary embodiment, the processing apparatus 3 performs a process selected in an accepted operation; however, the operation accepted by the processing apparatus 3 may be divided into a first operation for selecting one of the plural processes that are performed by the processing apparatus 3 and a second operation for giving an instruction for performing the process selected in the first operation.

In this case, the processing apparatus 3 need not immediately perform the process selected in the first operation at the stage at which the first operation is accepted. The processing apparatus 3 may perform the process selected in the first operation when accepting the second operation.

That is, the processing apparatus 3 may schedule the process selected in the first operation upon acceptance of the first operation and may perform the scheduled process at the timing at which the second operation is accepted. When the processing apparatus 3 accepts the first operation, the processing apparatus 3 updates the reservation information 322 so that one or more resources not necessary for the process selected in the first operation are released to thereby manage the resources.

2-5. Fifth Modification

In the above-described fourth modification, the processing apparatus 3 accepts a first operation for selecting and scheduling a process and a second operation for performing the process scheduled in accordance with the first operation. The processing apparatus 3 may further accept a third operation for giving an instruction for stopping performing of the process selected in the first operation. In this case, the processing apparatus 3 stops performing of the process selected in the first operation in response to acceptance of the third operation and updates the reservation information 322 so that one or more resources necessary for the process are released to thereby manage the resources.

2-6. Sixth Modification

In the above-described fourth modification, the processing apparatus 3 manages the resources such that the processing apparatus 3 reserves all of the resources upon detection of a user and releases, upon acceptance of a first operation, one or more resources not necessary for a process selected in the first operation. However, the processing apparatus 3 may manage the resources in accordance with the elapsed time. For example, when a predetermined time has elapsed since a first operation was accepted, the processing apparatus 3 may update the reservation information 322 so that one or more resources necessary for the process selected in the first operation are released to thereby manage the resources.

2-7. Seventh Modification

The program executed by the controller 31 of the processing apparatus 3 may be provided in a state where the program is stored in a computer-readable recording medium, namely, a magnetic recording medium, such as a magnetic tape or a magnetic disk, an optical recording medium, such as an optical disc, a magneto-optical recording medium, or a semiconductor memory. It is possible to download the program via a communication line, such as the Internet. As a control unit that is illustrated as the controller 31 described above, various devices other than a CPU may be used. For example, a dedicated processor is used, for example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A processing apparatus comprising:
 a memory that stores reservation information indicating a state of each of a plurality of resources of the processing apparatus;
 a detector that detects a user;
 an acceptance unit that accepts a first operation performed by the user for selecting a first process of a plurality of processes which the processing apparatus is configured to perform; and
 a manager that manages the plurality of resources of the processing apparatus, the plurality of resources corresponding to the plurality of processes, the manager being configured to
 (i) upon detection of the user by the detector, reserve the plurality of resources for all of the plurality of processes which the processing apparatus is configured to perform, wherein, in response to the detector detecting the user, the manager overwrites the states of all of the plurality of resources in the reservation information to indicate that the plurality of resources are reserved for the user, and
 (ii) upon acceptance of the first operation by the acceptance unit for the first process, release one or more of the plurality of resources not necessary for the first process selected in the first operation, wherein the manager overwrites the state of the one or more of the plurality of resources in the reserva- tion information to indicate that the one or more of the plurality of resources are released.

2. The processing apparatus according to claim 1, wherein the detector detects the user in a case where the detector succeeds in authenticating the user.

3. The processing apparatus according to claim 1, further comprising:
a performing unit that performs the first process selected in the first operation, wherein
the acceptance unit accepts the first operation for selecting the first process from among the plurality of processes and a second operation for giving an instruction for causing the processing apparatus to perform the first process selected in the first operation,
the manager manages the plurality of resources so as to release, upon acceptance of the first operation by the acceptance unit, the one or more resources not necessary for the first process selected in the first operation among the reserved resources, and
the performing unit performs the first process selected in the first operation upon acceptance of the second operation by the acceptance unit.

4. The processing apparatus according to claim 3, wherein the acceptance unit further accepts a third operation for giving an instruction for stopping performing of the first process selected in the first operation, and
the manager manages the plurality of resources so as to release a resource necessary for the first process selected in the first operation upon acceptance of the third operation by the acceptance unit.

5. The processing apparatus according to claim 3, wherein the manager manages the plurality of resources so as to release a resource necessary for the first process selected in the first operation when a predetermined time has elapsed since acceptance of the first operation by the acceptance unit.

6. The processing apparatus according to claim 1, wherein the acceptance unit accepts the first operation for selecting a process that uses only a resource not reserved by the manager.

7. The processing apparatus according to claim 1, wherein the memory stores destinations of communication used in the processes and types of the processes in association with each other, wherein
the acceptance unit accepts an operation performed by the user for selecting a destination from among the destinations, and
the manager manages the plurality of resources so as to release, upon acceptance of the operation by the acceptance unit, a resource among the plurality of resources that is not necessary for a process of a type stored in the memory in association with the destination selected in the operation.

8. The processing apparatus according to claim 1, wherein the manager manages the plurality of resources so as to release one or more resources necessary for the first process selected in the first operation when a predetermined time has elapsed since acceptance of the first operation by the acceptance unit, and the manager overwrites the state of the one or more resources in the reservation information to indicate that the one or more resources are released.

9. A processing system comprising:
a terminal; and
a processing apparatus,
the terminal including an acceptance unit that accepts a first operation performed by a user for selecting a first process of a plurality of processes which the processing apparatus is configured to perform,
the processing apparatus including
a memory that stores reservation information indicating a state of each of a plurality of resources of the processing apparatus,
a detector that detects the user, and
a manager that manages the plurality of resources of the processing apparatus, the plurality of resources corresponding to the plurality of processes, the manager being configured to
(i) upon detection of the user by the detector, reserve the plurality of resources for all of the plurality of processes which the processing apparatus is configured to perform, wherein, in response to the detector detecting the user, the manager overwrites the states of all of the plurality of resources in the reservation information to indicate that the plurality of resources are reserved for the user, and
(ii) upon acceptance of the first operation by the acceptance unit for the first process, release one or more of the plurality of resources not necessary for the first process selected in the first operation, wherein the manager overwrites the state of the one or more of the plurality of resources in the reservation information to indicate that the one or more of the plurality of resources are released.

10. The processing system according to claim 9, wherein the manager manages the plurality of resources so as to release one or more resources necessary for the first process selected in the first operation when a predetermined time has elapsed since acceptance of the first operation by the acceptance unit, and the manager overwrites the state of the one or more resources in the reservation information to indicate that the one or more resources are released.

11. A non-transitory computer readable medium storing a program causing a computer to execute a process, the process comprising:
storing reservation information indicating a state of each of a plurality of resources of a processing apparatus;
detecting a user;
accepting a first operation performed by the user for selecting a first process of a plurality of processes which the processing apparatus is configured to perform; and
managing the plurality of resources of the processing apparatus, the plurality of resources corresponding to the plurality of processes, the managing including
(i) upon detection of the user, reserving the plurality of resources for all of the plurality of processes which the processing apparatus is configured to perform, wherein, in response to detecting the user, the states of all of the plurality of resources are overwritten in the reservation information to indicate that the plurality of resources are reserved for the user, and
(ii) upon acceptance of the first operation for the first process, releasing one or more of the plurality of resources not necessary for the first process selected in the first operation, wherein the state of the one or more of the plurality of resources is overwritten in the reservation information to indicate that the one or more of the plurality of resources are released.

12. The non-transitory computer readable medium according to claim 11, wherein the process further comprises managing the plurality of resources so as to release one or more resources necessary for the first process selected in the first operation when a predetermined time has elapsed since acceptance of the first operation, and overwriting the state of the one or more resources in the reservation information to indicate that the one or more resources are released.

13. A processing method comprising:

storing reservation information indicating a state of each of a plurality of resources of a processing apparatus;

detecting a user;

accepting a first operation performed by the user for selecting a first process of a plurality of processes which the processing apparatus is configured to perform; and managing the plurality of resources of the processing apparatus, the plurality of resources corresponding to the plurality of processes, the managing including
(i) upon detection of the user, reserving the plurality of resources for all of the plurality of processes which the processing apparatus is configured to perform, wherein, in response to detecting the user, the states of all of the plurality of resources are overwritten in the reservation information to indicate that the plurality of resources are reserved for the user, and
(ii) upon acceptance of the first operation for the first process, releasing one or more of the plurality of resources not necessary for the first process selected in the first operation, wherein the state of the one or more of the plurality of resources is overwritten in the reservation information to indicate that the one or more of the plurality of resources are released.

14. The processing method according to claim 13, further comprising managing the plurality of resources so as to release one or more resources necessary for the first process selected in the first operation when a predetermined time has elapsed since acceptance of the first operation, and overwriting the state of the one or more resources in the reservation information to indicate that the one or more resources are released.

* * * * *